Patented Nov. 6, 1934

1,979,936

UNITED STATES PATENT OFFICE 1,979,936

METHOD OF COATING AND THE PRODUCT RESULTING THEREFROM

Otto Herrmann, Wiesbaden, Germany, assignor to Du Pont Cellophane Company, Inc., New York, N. Y., a corporation of Delaware No Drawing. Application June 22, 1931, Serial No. 546,149. In Germany June 30, 1930

8 Claims. (Cl. 91—70)

This invention relates to a method of coating and to the product resulting therefrom. More particularly, it relates to a flexible coated material and to a method of directly producing said flexible coated material, wherein no subsequent operation for imparting flexibility to the product after the coating process is required.

Prior to this invention, when a base was coated with a composition containing a solvent, i. e. one or more solvents with or without diluents, for the purpose of rendering it moistureproof, waterproof or both, the coated material was subjected to an elevated temperature to remove the solvent. When such a process was applied to a base which contained moisture, the evaporation of the solvent carried with it a considerable quantity of the moisture. This was particularly true when one or more of the ingredients constituting the solvent of the coating composition formed a constant boiling mixture with water. The partial removal of the moisture from the base resulted in the destruction or at least a substantial reduction of certain desirable properties imparted to the product by the original moisture content of the base. For example, when a cellulosic material, such as a flexible sheet or film of regenerated cellulose, which contained moisture was coated for the purpose of rendering it waterproof, moistureproof, or both by a method which comprised applying a waterproofing or moistureproofing composition thereto and drying the coated material at an elevated temperature, there resulted a product which was quite brittle. The brittleness of the product was disadvantageous, especially in the further fabrication or use of the material. Consequently, attempts have been made to restore or impart greater flexibility to the product. At the present time the flexibility of the product is increased by incorporating moisture in the base, such as by subjecting the coated material after drying or elimination of the solvent to a humidifying treatment.

It has been found that by applying the coating composition to the base in the presence of a substance, such as formamide, and subsequently drying the coated material at an elevated temperature, there will be secured a product which is sufficiently flexible for successful subsequent use and which does not require any subsequent treatment for rendering it flexible.

It is therefore an object of this invention to provide a method of directly producing a flexible coated material by coating a base with a composition containing a solvent and subsequently eliminating the solvent at an elevated temperature.

Another object of this invention is to provide a method of directly producing a coated flexible material which comprises applying the composition to the base in the presence of a substance like formamide and drying the coated material at an elevated temperature.

A specific object of this invention is to provide a method of preparing a flexible moistureproof or waterproof material, such as a moistureproof sheet or film of regenerated cellulose, which comprises applying a waterproofing or moistureproofing composition to a sheet or film of regenerated cellulose in the presence of a substance like formamide and evaporating the solvent of the coating composition at an elevated temperature.

A further object of this invention is to provide materials produced by the methods set forth in the preceding objects.

Other objects will appear from the following description and appended claims.

To achieve the above-mentioned desiderata, the base, and particularly one of the type hereafter more fully explained, is coated with the desired composition in the presence of a substance, such as formamide, and the coated material subjected to an elevated temperature for the purpose of removing the solvent of the coating composition and/or drying the coated material.

The base is preferably a material containing moisture, which material suffers a loss of moisture during the process of drying the coated material or eliminating the solvent of the coating composition, with the result that the coated product is more or less brittle. Unesterified cellulosic materials, such as sheets or films of regenerated cellulose, are illustrative examples of the type of base to be processed in accordance with this invention. When sheets or films of regenerated cellulose lose their moisture content they become quite brittle. As additional examples of bases may be mentioned other unesterified cellulosic materials, such as paper, etc., and non-cellulosic materials, such as sheets or films of gelatin, preferably hardened, which materials suffer a loss of moisture during the process of eliminating the solvent of the coating composition, though the loss of moisture and the resultant brittleness of these materials are not nearly so critical as they are in the case of sheets or films of regenerated cellulose.

The base may be treated with formamide, either prior to the actual coating operation or simultaneously with the application of the coating composition. In the first-mentioned procedure, the formamide may be applied to the base in any convenient manner. The preferred form of procedure contemplates subjecting the base to a bath containing the formamide prior to the application of the coating. When an aqueous solution of formamide is employed the treated base is first dried and then coated. If the formamide is to be applied simultaneously with the coating solution, this is secured by adding or incorporating it in the coating composition.

The quantity of formamide incorporated in the base depends on the desired degree of flexibility desired in the product and hence may vary within wide limits. Satisfactory results have been secured when 5% to 20% or more, and preferably 10% of formamide is incorporated in the base, the proportions being by weight and based on the base.

Any coating composition which is dried at an elevated temperature may be successfully employed in this invention. As illustrative examples of satisfactory coating compositions there may be mentioned varnishes and lacquers of all types and moistureproofing compositions, for example moistureproofing compositions containing a minor portion of a wax and a colloidal organic film-forming vehicle, such as cellulose derivative, drying oil or resin, with or without resins and/or with or without plasticizers.

In order to more fully explain and describe this invention, it will hereafter be described in connection with the waterproofing or moistureproofing of sheets or films of regenerated cellulose.

A sheet or film of regenerated cellulose is coated in any well-known manner with a coating composition, such as a lacquer or moistureproofing composition containing formamide, such as, for example, 2% more or less of the lacquer. The coating is preferably of such a thickness that it will possess a sufficient amount of formamide to impart the desired properties to the product. In some instances, it is advantageous if the lacquer contains one or more ingredients in which the formamide is soluble. As an illustrative example of such ingredients may be mentioned the high boiling point solvents, such as methyl glycol, ethyl glycol, benzyl glycol, and the like.

After the application of the coating composition, the coated film is dried at an elevated temperature to remove the solvent of the coating composition. The coated materials produced by this procedure are considerably more flexible and softer than similar products produced without the addition of formamide.

Instead of adding the formamide to the coating composition per se, the present invention, as previously stated, also contemplates the treatment of the materials to be coated first with formamide and then with the coating composition in the usual way. According to this procedure, a sheet or film of regenerated cellulose is passed through a bath containing formamide and the excess quantity thereof removed in any suitable manner, such as, for example, by squeeze rolls, wipers, and the like. When this process is carried out it has been found that optimum results are secured when the impregnated film is coated directly after the impregnation with the formamide. The coated material, of course, is substantially immediately dried at an elevated temperature.

The treatment or impregnation with the formamide swells the sheet or film of regenerated cellulose, and the swollen and extensible state of the sheet or film greatly facilitates and aids in the application and production of a substantially uniform coating.

The degree of impregnation and the amount of formamide incorporated may be varied within wide limits. This is usually secured by employing a formamide solution diluted with solvents, such as volatile solvents, to give the desired concentration. Preferably, the concentration of the formamide bath is so adjusted that the coated product possesses the required flexibility after coating.

Another modification of this process contemplates treating the sheet or film of regenerated cellulose with the formamide while it is in the gel state. This is accomplished by impregnating the sheet or film of regenerated cellulose during the production thereof and prior to drying. In this process, the sheets or films of regenerated cellulose, after having been purified and washed, are passed through a bath containing formamide, for instance in the form of an aqueous solution thereof. The formamide may also be added to a bath used in the production process mentioned, preferably to the last bath containing an aqueous solution of glycerine. The impregnated film is dried and thereafter coated and dried at an elevated temperature.

The coated products resulting from the methods constituting this invention possess the desired degree of flexibility. This characteristic results directly from the process employed and is not secured by a subsequent step. When transparent bases are treated the transparency is not impaired.

Since it is obvious that various changes and modifications may be made in the above description without departing from the nature and spirit thereof, this invention is not restricted thereto except as set forth in the appended claims.

I claim:

1. A process of preparing coated materials which comprises applying a coating composition to a sheet or film of regenerated cellulose in the presence of formamide and drying the coated material at an elevated temperature to evaporate the volatile solvent of the coating composition, the formamide remaining in the product and imparting flexibility thereto.

2. A process of preparing coated materials which comprises applying a coating composition containing formamide to a sheet or film of regenerated cellulose and drying the coated material at an elevated temperature to evaporate the volatile solvent of the coating composition, the formamide remaining in the product and imparting flexibility thereto.

3. A process of preparing coated materials which comprises treating a sheet or film of regenerated cellulose with formamide, applying a coating composition to the treated sheet or film and drying the coated material at an elevated temperature to evaporate the volatile solvent of the coating composition, the formamide remaining in the product and imparting flexibility thereto.

4. A method of preparing coated materials which comprises treating a sheet or film of regenerated cellulose in the gel state with a solution containing formamide, drying the film, applying a coating composition and drying the coated material at an elevated temperature to evaporate the volatile solvent of the coating composition, the formamide remaining in the product and imparting flexibility thereto.

5. A coated material having a base comprising a sheet or film of regenerated cellulose rendered flexible by formamide.

6. A coated material comprising a sheet or film of regenerated cellulose coated with a composition containing formamide.

7. A coated material having a base comprising a sheet or film of regenerated cellulose impregnated with from approximately 5% to 20% of formamide, the proportions being by weight and based on the said base.

8. A coated material having a base comprising a sheet or film of regenerated cellulose impregnated with 10% of formamide, the proportions being by weight and based on the said base.

OTTO HERRMANN.